United States Patent [19]

Fujii et al.

[11] Patent Number: 4,756,975

[45] Date of Patent: Jul. 12, 1988

[54] PROCESS FOR COATING AUTOMOTIVE OUTER BODIES

[75] Inventors: Yasuhiro Fujii; Osamu Iwase; Hiroshi Oosumimoto; Shinji Sugiura; Ichiro Tabushi; Masafumi Kume; Takashi Udagawa; Komaharu Matsui, all of Hiratsuka, Japan

[73] Assignee: Kansai Paint Co., Ltd., Amagasaki, Japan

[21] Appl. No.: 796,450

[22] Filed: Nov. 8, 1985

[30] Foreign Application Priority Data

Nov. 12, 1984 [JP] Japan ................................ 59-236743
Dec. 10, 1984 [JP] Japan ................................ 59-260197

[51] Int. Cl.$^4$ ...................... B32B 15/08; C25D 13/00; B05D 3/02
[52] U.S. Cl. ................................ 428/461; 204/181.3; 427/27; 427/195; 427/202; 427/407.1; 427/409
[58] Field of Search ............. 427/27, 195, 202, 407.1, 427/409; 428/461; 204/180.2, 181.1, 181.3, 14.1, 23, 29

[56] References Cited

U.S. PATENT DOCUMENTS

| | | |
|---|---|---|
| 3,922,473 | 11/1975 | Kosaka et al. ................ 427/409 X |
| 3,998,716 | 12/1976 | Masar et al. .................... 204/181.1 |
| 4,139,672 | 2/1979 | Ozawa et al. .................. 427/202 X |
| 4,175,018 | 11/1979 | Gacesa ............................ 204/181.1 |
| 4,259,163 | 3/1981 | Suzuki et al. .................. 204/181.1 |
| 4,312,902 | 1/1982 | Murase et al. ..................... 427/386 |
| 4,358,508 | 11/1982 | Tanaka et al. ................ 427/195 X |
| 4,370,190 | 1/1983 | Ichinose et al. ............... 427/409 X |
| 4,481,239 | 11/1984 | Eckner ................................. 428/36 |
| 4,508,767 | 4/1985 | Hokamura et al. ............. 427/407.1 |
| 4,529,632 | 7/1985 | Fujii et al. .......................... 427/409 |
| 4,555,412 | 11/1985 | Günter et al. ....................... 427/27 |

*Primary Examiner*—Thurman K. Page
*Attorney, Agent, or Firm*—Wenderoth, Lind & Ponack

[57] ABSTRACT

A process for coating automotive bodies which are composed of metallic members and plastic members, said process comprising assembling metallic members and plastic members into automotive outer bodies, applying a cation type electrocoating to the metallic members either before or after the assembling, applying onto the surfaces of the two types of members including the electrocoated surfaces of the assembled body a barrier coat comprising a modified polyolefin resin and capable of forming a barrier coat film having a static glass transition temperature of 0° to −60° C., optionally applying on said barrier coat an intermediate coating paint and then applying thereon a top coating paint.

33 Claims, No Drawings

PROCESS FOR COATING AUTOMOTIVE OUTER BODIES

This invention relates to a process for coating automotive outer bodies. More particularly, the invention relates to a process for coating automotive outer bodies composed of assemblies of metallic and plastic members.

Automotive outer bodies such as bumpers, facias, fenders, door panels, panel hoods, panel roofs, panel trunk lids, etc., which have been heretofore composed mostly of metallic members, are recently increasingly replaced by plastic members, either partly or completely. For example, as bumpers and facias those made of plastics such as polyurethane, polypropylene, polycarbonate or the like, are used. There are also fenders and door panels of which lower portions only are made of plastics as above. It is inevitable that the plastics will be used in still increased scales for automotive outer bodies, that tendency being already clear with panel roofs and panel trunk lids. This is because of such advantages derived from the use of plastics, as reduction in fuel cost due to reduced automotive body weight, easier workability allowing molding into optional forms, improvement in corrosion resistance and impact resistance of the automotive bodies.

Under such recent trend, however, a process for coating the automotive outer bodies composed of metallic and plastic members has not yet been at all established, and heretofore the metallic members and plastic members entirely differing in physical and chemical properties were coated through separate coating lines with different types of paints respectively suitable for the metals and plastics, and thereafter assembled into the outer bodies. With such a method, however, it is extremely difficult to coordinate the color tones of the two types of members to be integrated into the automotive body because the paints used for the members (particularly the colored base coating paints) are different. There are also still other defects that the coating steps and the subsequent assembling step of those members are rendered complex.

In the field of automobile coating, furthermore there has come to be taken up more seriously the durability of the coating film on automotive outer bodies, particularly, the problem of progressive corrosion of metal materials in the outer bodies caused by the impact cracking of the coating film. For example, in the cold climatic areas of Europe and America, in order to prevent the surface freezing of roads for automobiles, there are often laid on the roads in winter pebbles mixed with a large quantity of rock salt ground to relatively coarse particles. In automobiles running on such roads, the coating film on their outer portions is hit by the rock salt particles and pebbles flipped by the wheels and this impact often causes an impact cracking phenomenon, namely, so-called "chipping" in which the coating film locally peels off the body completely. Owing to this phenomenon, the metal surface of the outer body beneath the hit areas of the coating film is exposed to an atmosphere leading to rapid formation of rust and progress of corrosion. The peeling of coating film due to chipping ordinarily appears more in the bottom and underbody but it appears even in the hood or the roof. It is known that the resulting local corrosion progresses to a considerable degree in about 6 months to one year.

In order to prevent the chipping and the resulting progress of corrosion of the metal parts there have heretofore been made various investigations on the chemical treatment, electrocoating primer, intermediate coating paint and top coating paint to be applied to the surface of metallic substrate of automotive outer body. But heretofore no practical solution has been yet found.

Under the circumstances, the present inventors have made concentrative studies in search for a process which will enable finishing of automotive bodies assembled from metallic members plastic members to an identical color by a simplified procedure, and furthermore the formation of coating film exhibiting excellent chipping resistance. As the result, it was found that the above defects could be overcome if the metallic members and plastic members, after being assembled into an integral body, are first applied with a barrier coat having a specific composition and properties, and then applied with the top coating paint, or an intermediate coating and top coating paints. Thus the present invention is completed.

According to the invention, therefore, there is provided a process for coating automotive outer bodies composed of metallic members and plastic members, which comprises assembling the metallic and plastic members into an automotive outer body, applying a cationic electrocoating paint to the metallic members either before or after the assembling, applying to the surfaces of the two types of members composing the assembled body, including the electrocoated surfaces, a barrier coating comprising a modified polyolefin resin of which coating film has a static glass transition temperature within the range of 0° C. $\sim$ $-60°$ C., optionally applying an intermediate coating paint onto the barrier coating, and thereafter applying thereto the top coating paint.

One of the conspicuous characteristics of the present invention resides, in the process comprising application of a top coating paint optionally after an intermediate coating paint, onto an automotive outer body composed of an assemblage of the cationic electrocoated metallic members and plastic members, in the advance application of a barrier coat having a specific composition and properties onto the outer body, preceding the application of said paint or paints. Consequently it was made possible to apply the same intermediate and top coating paints to both the metallic and plastic members, to eliminate the disagreement in color tones between the two types of members. Furthermore, thus formed coating film exhibits markedly improved chipping resistance, corrosion resistance and physical properties.

Namely, the barrier coat film whose static glass transition temperature is adjusted to 0° to $-60°$ C. (more preferably whose elongation at break at $-20°$ C. is adjusted in advance to 100 to 1,000% as will be later described) is flexible as compared with conventional intermediate and top coating films and has a viscoelasticity inherently possesed by the modified polyolefin resins. Therefore, by applying in advance the coating film having such physical properties onto the entire surfaces of both metallic and plastic members of an automotive outer body, all or nearly all of the "strain" between the intermediate coating film and top coating film due to the physical differences between the two types of members such as thermal elasticity and pliability, etc. can be absorbed by the barrier coat. Thus the effects of "strain" on the intermediate and top coating films can be almost completely prevented. Consequently, it is made possible to apply the intermediate and top coating paints of identical compositions, respectively, to the entire surfaces of the two types of members composing the automotive outer body, to finish them to an identical color tone.

Furthermore, when the surfaces of the coating film composed of the top coating optionally with an intermediate coating formed on the outer body through the barrier coat are subject to intense impact forces exerted by rock salt or pebbles, all or nearly all of the impact energy is absorbed by the barrier coat, so that peeling of the coating film scarcely takes place. Furthermore, occurrence of physical damages in the top coating film also can be nearly completely eliminated, realizing prevention of peeling-off of the top coating and in certain cases also the intermediate coating by chipping, as well as of rusting and corrosion of metal members.

Hereinafter the coating process of this invention will be more specifically explained.

Automotive outer body

In the present process, the term "automotive outer body" intended for the coating means the outer body formed by assembling and integrating the metallic members and plastic members, e.g., such parts as a bumper, facia, fender, door panel, panel hood, panel roof, panel trunk lid, or the like, and those composed of more than one of above parts, by combining and integrating them. That is, the term is meant to include each individual part itself composed of plastic members and metallic members; and those in which part(s) composed of metal members and part(s) composed of plastic members are integrated. The metallic members are mainly made of iron, copper, aluminium, zinc or alloys containing them, and the plastic members are composed of such synthetic resins as, for example, polyamides, polyurethanes, polypropylenes and polycarbonates.

It should be understood, furthermore, that the term, "automotive" used in the "automotive outer body" is not limited to those for riding, but is used in the broader sense inclusive of motorcycles, trucks, safari cars, and the like.

Cationic electrocoating paint

To the metallic members, a cation type electrocoating paint is applied. The application of this cation type electrocoating paint can be preferably practiced before assembling the metallic members and plastic members into an outer body, but in certain cases it may be effected after the assembling. If the occasion demands, it is recommendable to subject the metallic members to a chemical treatment with, for example, zinc phosphate, iron phosphate or chromates, in accordance with accepted practices, in advance of the cation type electrocoating application.

As the electrocoating paints for coating the metallic members, cation type electrocoating paints known per se and which are frequently used as the primer for automotive steel sheets [e.g., those disclosed in the literatures such as "Kobunshi Kako", Vol. 25, No. 11, pages 5–10 (1976)] can be used.

Cation type electrocoating paints include thermosetting electrocoating paints of cathodic deposition type wherein a base resin having basic amino groups is neutralized with an acid and dissolved (or dispersed) in water. These paints are coated on the metallic members using the latter as the cathode.

As the resins having basic amino groups, there are suitably used resins generally having a base value of about 20 to about 200 obtained by, for example, (1) addition of an amine to epoxy groups (oxirane rings) of an epoxy group-containing resin such as a bisphenol type epoxy resin, an epoxy group-containing (or glycidyl group-containing) acryl resin, a glycidyl ether of alkylene glycol, an epoxidized polybutadiene, an epoxidized novolak phenol resin or the like, (2) polymerization using, as a monomer, an unsaturated compound having basic amino groups such as N,N-dimethylaminoethyl methacrylate, N,N-diethylaminoethyl acrylate, N-vinylpyrazole or the like, (3) reaction of a polyisocyanate compound with a glycol containing, as one component, a tertiary amino group-containing glycol (e.g. N-methyldiethanolamine) and (4) introduction of amino groups to a resin by an imidoamine formation reaction between an acid anhydride and a diamine.

As the amine used in the above reaction (1), there can be mentioned primary amines, secondary amines and tertiary amine salts of aliphatic type, alicyclic type and araliphatic type. Products obtained by adding to the epoxy group-containing resin mentioned in (1), a secondary sulfide salt or a tertiary phosphine salt in place of said amine can also be used in the present invention as a vehicle component of the cation type electrocoating paint.

As the neutralizing agent to neutralize the resin having basic amino groups to dissolve (or disperse) the resin in water, there can be used, for example, organic acids such as acetic acid, hydroxyacetic acid, propionic acid, butyric acid, lactic acid, glycine and the like as well as inorganic acids such as sulfuric acid, hydrochloric acid, phosphoric acid and the like. The appropriate amount of the neutralizing agent to the resin is about 0.1 to about 0.4 times the neutralization equivalent for the base value of the resin (generally about 20 to about 200).

As the crosslinking agent incorporated into the cation type electrocoating paint to make it thermosetting, there is generally used a blocked polyisocyanate compound. When the electrocoating film so formed is heated (ordinarily to 140° C. or higher), the crosslinking agent causes dissociation, whereby the isocyanate groups are regenerated and cause a crosslinking reaction with active hydrogen-containing functional groups (e.g. hydroxyl group) present in the cation type resin as above and curing of the film.

Into the cation type electrocoating paint usable in the present invention are further incorporated, as necessary, pigments, hydrophilic organic solvents (e.g. isopropanol, n-butanol, ethoxyethanol, diethylene glycol monomethyl ether, diethylene glycol monoethyl ether, diethylene glycol monobutyl ether) and ordinarily used additives. The resulting mixture is adjusted with a de-ionized water so as to have a solid content of about 5 to about 40% by weight and its pH is kept at 5.5 to 8.0.

The cation type electrocoating paint thus prepared is subjected to cation electrocoating. It is usually conducted under conditions of 15° to 35° C. (bath temperature) and 100 to 400 V (load voltage) using the metallic members as the cathode. The electrocoating film thickness is not particularly restricted and can vary largely depending upon the intended application of finished product, etc. However, the thickness is preferred to be generally 10 to 40$\mu$, particularly 15 to 40$\mu$ in terms of cured film thickness of flat portions. The baking and curing temperature of the coating film is suitably 100° to 210° C. generally.

In the preparation of the cation type electrocoating paint, conventionally pigments have normally been used, in order not to reduce the smoothness of coating film, in an amount less than 40 parts by weight, ordinarily 35 parts by weight or less based on 100 parts by weight of resin solid. In the present invention, too, pigments can be used in the cation type electrocoating paint in the above amount. However, it was found in the present invention that use of pigments in the electrocoating paint in an amount of 40 parts by weight or more based on 100 parts by weight of resin solid can give a final coating product whose metallic members (especially, its acute-angled portions) is further improved in corrosion resistance and chipping resistance.

Automotive bodies contain many acute-angled portions of steel panel such as side, bottom and inside of facia, fender, door panel, panel hood, panel roof, panel trunk lid and body. Unlike other flat portions, these acute-angled portions have an acute-angled or projected shape. At such portions, paints do not adhere sufficiently and, once adhered, melt-flow during heat curing. Therefore, it has been inevitable that the film thickness gets thinner at the acute-angled portions as compared with that of flat portions and, especially at very acute-angled portions, the film thickness becomes extremely thin. As a result, the acute-angled portions have far inferior corrosion resistance than the flat portions and rust tends to easily appear first in the acute-angled portions. In contrast, when the present process is carried out using a cation type electrocoating paint containing pigments at high concentrations, the electrocoating paint adheres sufficiently even to the acute-angled portions and fine uneven portions present on the surface of the electrocoating film are filled by barrier coat (to be described later), whereby the penetration of an intermediate coating paint or a top coating paint can be prevented and a coating system having improved surface smoothness, distinctness of image gloss, corrosion resistance of acute-angled portions, etc. can be obtained.

The amount of pigment incorporated in the cation type electrocoating paint in order to obtain such a coating system is more than that in normal cases, more specifically 40 to 150 parts by weight, preferably 55 to 100 parts by weight, more preferably 60 to 85 parts by weight, based on 100 parts by weight of resin solid. Needless to say, there can also be used in the present invention an amount less than 40 parts by weight, ordinarily 35 parts by weight or less based on 100 parts by weight of resin solid which hitherto has been used generally. The pigments usable in the cation type electrocoating paint are not particularly restricted in type and include color pigments, extender pigments, rust preventive pigments, etc. which are known per se. As such pigments, there can be mentioned, for example, zinc oxide, antimony white, basic lead sulfate, basic lead carbonate, titanium dioxide, lithopone, lead silicate, zirconium oxide, carbon black, graphite, black iron oxide, aniline black, cuprous oxide, cadmium red, chrome vermilion, red iron oxide, pigment red, pigment violet, pigment orange, basic lead chromate, chrome yellow, ocher, cadmium yellow, strontium chromate, titanium yellow, litharge, pigment yellow, pigment green, zinc green, chrome green, chromium oxide, Phthalocyanine Green, ultramarine, prussian blue, Phthalocyanine Blue, pigment blud, cobalt violet, pigment violet, zinc powder, zinc oxide, red lead, lead cyanide, calcium plumbate, zinc yellow, silicon carbide, aluminum powder, asbestine, alumina, clay, diatomaceous earth, slaked lime, gypsum, talc, barium carbonate, precipitated calcium carbonate, calcium carbonate, precipitated barium sulfate, barite, bentonite, white carbon, glass beads, etc. These pigments can be used alone or in a combination of two or more.

In case corrosion-resistant pigments are to be incorporated into the later-described barrier coat, water absorption of the electrocoating film is preferably adjusted in advance to 0.3–20% by weight, particularly 0.5–5% by weight, in order to allow the pigments to fully exhibit their corrosion-preventive ability.

The "water absorption" of the electrocoated film is the value calculated as follows: a cation tyhpe electrocoating paint is applied onto a substrate to a cured film thickness of $20\mu$ (applied area: $5\times 5$ cm), baked under the conditions suitable for the components therein, and the coating film is isolated. The film is immersed in warm water of 50° C. for 48 hours, and its weight immediately after withdrawal from the water and that after drying it at 105° C. for an hour are measured, which are inserted into the equation below:

Water absorption of coating film =

$$\frac{\text{film weight immediately after withdrawal from warm water} - \text{film weight after drying}}{\text{film weight after drying}} \times 100$$

Adjustment of the water absorption of the cation type electrocoating film as above presumably facilitates the penetration of the water-extracted component of the corrosion-resistant pigment from the barrier coat containing said pigment into the electrocoating film, to fully exhibit its cathode- (or anode-) inhibiting effect on the surface of metallic member and to protect the metallic member. The adjustment of water absorption can be easily effected by controlling the crosslinking density of the coating film, introduction of hydrophilic groups into the vehicle resin and the amount of blending extender pigment, or the like.

When such a corrosion-preventive pigment is contained in the barrier coat, the use of the corrosion-resistant pigment in the cation type electrocoating paint can be omitted.

Thus electrocoated metallic members can be assembled and integrated with plastic members at this stage to provide automotive outer bodies, if they were not assembled in advance of the electrocoating.

Preferably the plastic members are subjected to such surface treatments as degreasing with solvent vapor, grinding, acid treatment, corona discharge, etc., preceding the application of barrier coat, with care not to adversely affect the electrocoating film (e.g., in a preferred embodiment of applying the cation type electrocoating before the assembling, the surface treatment is given before assemblage with the electrocoated metallic members).

In the present invention, a barrier coat is applied to the surfaces of the cation type electrocoated metallic members and of the plastic members as assembled into automotive outer bodies.

Barrier coat

This is a composition to be applied onto the cation type electrocoated surfaces. It is a coating composition composed mainly of a modified polyolefin resin and capable of forming a barrier coat film having a static glass transition temperature of 0° to −60° C., preferably −30° to −60° C., more preferably −40° to −50° C. The above "modified polyolefin resin" refers to a resin which is composed mainly of a polyolefin resin and wherein the resin is modified by a chemical reaction or is mixed with a modifying agent. The base polyolefin to be modified includes a homopolymer or copolymer of at least one member selected from ethylenic hydrocarbons represented by the general formula $C_nH_{2n}$ ($n=2$ to 10) such as ethylene, propylene, butene, pentene, heptene, octene and the like. The base polyolefin resin preferably has a number average molecular weight of 10,000 to 1,000,000, particularly 100,000 to 800,000.

As the modified polyolefin resin obtained by modifying a base polyolefin by a chemical reaction, there are, for example, the following resins.

(A-1) Resins obtained by graft-polymerizing maleic acid or maleic anhydride onto a base polyolefin resin. Particularly preferable among these is a resin obtained by graft-polymerizing 0.1 to 50 parts by weight, preferably 0.3 to 20 parts by weight of maleic acid or maleic anhydride to 100 parts by weight of a propylene-ethylene copolymer (the mole ratio of propylene:ethylene is ordinarily 40:60 to 80:20, preferably 50:50 to 70:30).

(A-2) Resins obtained by graft-polymerizing acrylic acid or methacrylic acid onto the chlorination product of a base polyolefin resin [e.g. a chlorinated polyolefin described in (B-1) which appears later]. Preferably, the amount of acrylic acid or methacrylic acid used is generally 0.1 to 50 parts by weight, particularly 1 to 30 parts by weight, based on 100 parts by weight of chlorinated polyolefin resin.

(A-3) Copolymers between (a) at least one member selected from the aforementioned ethylenic hydrocarbons and (b) at least one comonomer selected from vinyl acetate, acrylic acid and methacrylic acid. In these copolymers, the ratio of the two components is preferred to be such that the former component is 99 to 30% and the latter component is 1 to 70% based on the total weight of the two components. The appropriate number average molecular weight of these copolymers is 10,000 to 800,000.

As the modified polyolefin resin obtained by adding to a base polyolefin resin another component (a modifying agent), there are, for example, the following resins.

(B-1) Compositions obtained by adding to 100 parts by weight of a base polyolefin preferably the same propylene-ethylene copolymer as mentioned in (A-1)], 1 to 90 parts by weight, preferably 1 to 60 parts by weight, more preferably 10 to 40 parts by weight, of a chlorinated polyolefin (preferably a chlorinated polypropylene) having a chlorination degree generally of about 1 to 60%, preferably 20 to 40% and a number average molecular weight ordinarily of 10,000 to 1,000,000, particularly 100,000 to 500,000.

(B-2) Compositions obtained by adding to the base polyolefin resin an acrylic resin having a static glass transition temperature of 0° C. or lower, preferably −10° C. or lower and a number average molecular weight of 5,000 to 100,000, in the same proportion as in (B-1).

(B-3) Compositions obtained by adding to 100 parts by weight of the base polyolefin resin, 1 to 90 parts by weight, preferably 1 to 60 parts by weight, more preferably 10 to 40 parts by weight of a styrene-butadiene copolymer (preferably having a styrene:butadiene weight ratio of 1:99 to 50:50).

Of the above modified polyolefin resins, (A-1) and (B-1) are particularly preferred.

These modified polyolefin resins are preferred to have by themselves a static glass transition temperature of 0° to −60° C.; however, this is not essential. What is essential is that a coating film formed by the barrier coat has the above static glass transition temperature. Accordingly, even if a modified polyolefin resin used does not have itself the static glass transition temperature within said range, the resin can provide a barrier coat capable of forming a coating film having a static glass transition temperature of 0° to −60° C., by using the resin in combination with a modifier for static glass transition temperature. Such a modifier for static glass transition temperature includes thickeners. As thickeners usable in the present invention process, there can be mentioned those having a good compatibility with a modified polyolefin resin used, such as, for example, a rosin, a rosin ester, a hydrogenated rosin, a polyterpene resin, an ester gum, an epoxy-modified polybutadiene, an aliphatic epoxy resin of low molecular weight, an aliphatic bisphenol type epoxy resin of low molecular weight, a polyoxytetramethylene glycol, a silicone rubber, a polyvinyl ethyl ether and a polyvinyl methyl ether. These thickeners preferably have a static glass transition temperature generally of +20° C. to −70° C. These thickeners can be added even to a modified polyolefin resin having a static glass transition temperature of 0° to −60° C. In this case, the coating film of the barrier coat obtained has a more desirable static glass transition temperature. The amount of the thickener to be used differs by the type thereof, the type of modified polyolefin resin used, the required physical properties of coating film formed, etc. and can not be strictly specified. However, the amount is generally 1 to 50 parts by weight, preferably 5 to 30 parts by weight based on 100 parts by weight of modified polyolefin resin.

The coating film formed by the barrier coat according to the present invention has a static glass transition temperature of 0° to −60° C., preferably −30° to −60° C., more preferably −40° to −55° C. In addition, the coating film desirably has an elongation at break ordinarily of 200 to 1,000%, preferably 300 to 800%, more preferably 400 to 800% in an atmosphere of −20° C.

"Static glass transition temperature" and "elongation at break" used in the present specification and the appended claims refer to the values obtained from the following measurement methods.

Test sample

A barrier coat was applied on a tin plate with the final film thickness of 25μ. Baking was conducted for 30 min. at 120° C., after which the coating film was isolated using an amalgam process. This film isolated was used as a test sample.

Measurment methods

For the above test sample, static glass transition temperature was measured using a differential scanning calorimeter (DSC-10 type manufactured by Daini Seikosha), elongation at break was measured at −20° C. using a universal tensile tester with constant temperature bath (Autograph S-D type manufactured by Shimadzu Corp.). In this measurement, the sample length was 20 mm and the tensile speed was 20 mm/min.

The modified polyolefin resin and if necessary the thickener are selected so as to give a barrier coat film having desired physical properties as mentioned previously.

The barrier coat composed mainly of a modified polyolefin resin can be prepared in a form of organic solvent type paint or aqueous type paint. The form of organic solvent type paint is preferable. Such a barrier coat of organic solvent type can be prepared by dissolving or dispersing a modified polyolefin and if necessary a modifier for static glass transition temperature in an organic solvent. As the organic solvent, there can be mentioned aromatic hydrocarbons such as benzene, toluene, xylene and the like; aliphatic hydrocarbons such as hexane, heptane, octane, decane and the like; chlorinated hydrocarbons such as trichloroethylene, perchloroethylene, dichloroethylene, dichloroethane, dichlorobenzene and the like.

When a powdery top coating paint is directly applied on the barrier coat film (an intermediate coating paint is not applied), it is preferable that the barrier coat contains, in addition to the above mentioned organic solvent, another organic solvent having a boiling point of 150° C. or higher and compatible with th top coating paint powder (hereinunder this organic solvent is referred to at times as "compatible solvent"), such as diisopropylbenzene, tetralin, decalin, o-dichlorobenzene, trichlorobenzene, benzyl alcohol, diisobutyl ketone, isophorone, cellosolve acetate, carbitol acetate, dimethyl phthalate or the like. Use of such a compatible solvent in combination with an organic solvent as mentioned above is preferable for the following reason. That is, when a barrier coat obtained by dissolving or dispersing a modified polyolefin resin in a mixed solvent consisting of an organic solvent and a compatible solvent is applied and subsequently a top coating paint powder is quickly applied on the still wet (not baked) barrier coat film and baked, the compatible solvent remaining in the barrier coat film evaporates and reaches the top coating powder film, whereby the resin powder is given an improved hot melt-flow characteristics and the smoothness of finished coating surface is remarkably improved. The amount of compatible solvent in mixed solvent is not critical, but preferably 5 to 50% by weight. The content of mixed solvent in barrier coat is appropriately 15 to 95% by weight. Thus, when a top coating paint powder is directly applied on a barier coat film and an intermediate coating paint is not applied, by applying a top coating paint powder on a barrier coat film which is still wet and contains a compatible solvent, there can be effectively provided a finished coating surface having improved smoothness.

Into the barrier coat can be incorporated various additives as necessary. For example, there can be incorporated pigments mentioned with respect to the cation type electrocoating paint, such as color pigments, extender pigments and the like. The amount of pigments incorporated can be generally 150 parts by weight or less, preferably 100 parts by weight or less, based on 100 parts by weight of modified polyolefin resin.

Into the barrier coat can further be incorporated, for purposes of, for example, (1) improvement of physical properties of coating film, (2) improvement of dispersibility of pigments and (3) filling, proper amounts of known additives for coatings such as, for example, a rosin, a rosin ester, a hydrogenated rosin, a polyterpene resin, an ester gum, an epoxy-modified polybutadiene, an aliphatic epoxy resin of low molecular weight, an aliphatic bisphenol type epoxy resin of low molecular weight, a polyoxytetramethylene glycol, a silicone rubber, a polyvinyl ethyl ether, a polyvinyl methyl ether, a pigment dispersing agent, a film surface improver and the like.

Also when the barrier coat is applied by electrostatic coating, preferably an electroconductive substance is blended with the barrier coat in advance to adjust the barrier coating so that the film formed therefrom should have a volume specific resistivity of no higher than $10^7 \Omega$ cm, particularly within the range of $10^3$–$10^5 \Omega$ cm. As such electroconductive substance may be used, for example, powders of electroconductive carbon, silver, nickel, aluminium, zinc oxide, tin dioxide, tungsten oxide and the like. The amount to be blended of such an electroconductive substance is not critical so long as it is not detrimentel to the physical performance of the barrier coating film, but normally preferred amount is at the most 150 parts by weight, particular 15–80 parts by weight, to 100 parts by weight of the modified polyolefin resin.

When the intermediate coating is omitted and a top coating paint is directly applied on the barrier coat film, it is preferable that the barrier coat further contains deterioration inhibitors for resins such as an ultraviolet absorber, a photostabilizer, an anti-oxidant and the like. The purpose of using such inhibitors is to absorb ultraviolet rays passing through the top coating film having a small hiding power and to prevent the oxidation of radicals generated in resin chains and thereby to protect the barrier coat film and the electrocoating film surface from being deteriorated with time by ultraviolet rays.

The ultraviolet absorber usable in the barrier coat can be any as long as it can absorb the energy of ultraviolet rays, is compatible with or uniformly dispersible in the modified polyolefin resin used in the barrier coat and does not easily decompose and lose its function at a temperature at which the barrier coat film or a whole coating system is baked. The usable ultraviolet absorber includes, for example, benzophenones such as benzophenone, 2,4-dihydroxybenzophenone, 2,2',4,4'-tetrahydroxybenzophenone, 2-hydroxy-4-methoxybenzophenone, 2,2'-dihydroxy-4,4'-dimethoxybenzophenone, 2,2'-dihydroxy-4-methoxybenzophenone, 2-hydroxy-4-octoxybenzophenone, 2-hydroxy-4-dodecyloxybenzophenone, 2-hydroxy-4-methoxy-5-sulfobenzophenone, 5-chloro-2-hydroxybenzophenone, 2,2'-dihydroxy-4,4'-dimethoxy-5-sulfobenzophenone, 2-hydroxy-4-methoxy-2'-carboxybenzophenone, 2-hydroxy-4-(2-hydroxy-3-methylacryloxy)propoxybenzophenone and the like; benzotriazoles such as 2-(2'-hydroxy-5'-methylphenyl)benzotriazole, 2-(2-hydroxy-3,5-di(1,1-dimethylbenzylphenyl)-2Hbenzotriazole, 2-(2'-hydroxy-3',5'-ditertiary-butylphenyl)benzotriazole, 2-(2'-hydroxy-3'-tertiary-butyl-5'-methylphenyl)benzotriazole, 2-(3,5-ditertiary-amyl-2-hydroxyphenyl)benzotriazole, 2-(2'-hydroxy-3',5'-ditertiary-butylphenyl)-5-chlorobenzotriazole, 2-(2'-hydroxy-3',5'-ditertiary-isoamylphenyl)benzotriazole, 2-(hydroxy-5-tertiary-butylphenyl)benzotriazole and the like; salicylic acid esters such as phenyl salicylate, 4-tertiary-butylphenyl salicylate, p-octylphenyl salicylate and the like; diphenyl acrylates such as ethyl-2-cyano-3,3'-diphenyl acrylate, 2-ethylhexyl-2-cyano-3,3'-diphenyl acrylate and the like; hydroxy-5-methoxyacetophenone; 2-hydroxynaphthophenone; 2-ethoxyethyl-p-methoxycinnamate; nickel bisoctylphenylsulfide; [2,2'-thiobis(4-t-octylphenolate)]-n-butylamine-nickel; oxalic acid anilide; etc. There are commercially available ultraviolet absorbers. As commercial products of benzotriazole type, there are mentioned, for example, Tinuvin 900 and Tinuvin 328, both of CIBA-Geigy Co. As products of benzophenone type, there is mentioned, for example, Uvinul 400 (a product of BASF). As products of oxalic acid anilide type, there is mentioned, for example, SANDUVOR 3206 of SANDOZ, Ltd.

The amount of ultraviolet absorber used is preferably 0.1 to 10 parts by weight, more preferably 0.5 to 5 parts by weight, based on 100 parts by weight of the modified polyolefin resin.

As the photostabilizer, there are mentioned, for example, tetrakis(2,2,6,6-tetramethyl-4-piperidyl) 1,2,3,4-butanetetracarboxylate, 8-acetyl-3-dodecyl-7,7,9,9-tetramethyl-1,3,8-triazaspiro(4,5)decane-2,4-dione, bis(1,2,2,6,6-pentamethyl-4-piperidinyl) sebacate, bis(2,2,6,6-tetramethyl-4-piperidyl) sebacate, bis(1,2,2,6,6-pentamethyl-4-piperidyl) sebacate, dimethyl-2-(4-hydroxy-2,2,6,6-tetramethyl-1-piperidyl) ethanol condensate, poly[6-(1,1,3,3-tetramethylbutyl) imino-1,3,5-triazine-2,4-diyl-4-(2,2,6,6-tetramethyl-piperidyl) hexamethylene-4,4-(2,2,6,6-tetramethyl-piperidyl)imino], 1-[2-3-(3,5-di-t-butyl-4-hydroxyphenyl)propionyloxyethyl]-4-3-(3,5-di-t-butyl-4-hydroxyphenyl)propionyloxy]-2,2,6,6-tetramethyl-piperidine, etc. As the anti-oxidant, there are mentioned, for example, 4,4'-thiobis-(3-methyl-6-t-butylphenyl), 2,2'-methylenebis-(4-methyl-6-t-butylphenol), 4,4'-methylenebis-(2,6-di-t-butylphenol), 1,3,5-trimethyl-2,4,6-tris(3,5-di-t-butyl-4-hydroxybenzyl) benzene, tris(2-methyl-4-hydroxy-5-t-butylphenyl)butene, pentaerythritol-tetrakis(3-laurylthiopropionate), dilaurylthio dipropionate, distearylthio dipropionate, dimyristylthio dipropionate, triethylene glycol bis-3-(3-t-butyl-5-methyl-4-hydroxyphenyl)propionate, 1,6-hexanediol bis-3-(3,5-di-t-butyl-4-hydroxyphenyl)propionate, 2,4-bis(n-octylthio)-6-(4-hydroxy-3,5-di-t-butylanilino)-1,3,5-triazine, pentaerythritol-tetrakis[3-(3,5-di-t-butyl-4-hydroxyphenyl)-propionate], 2,2-thiodiethylene-bis3-(3,5-di-t-butyl-4-hydroxyphenyl)-propionate], octadecyl 3-(3,5-di-t-butyl-4-hydroxyphenyl)propionate, 2,2-thiobis-(4-methyl-6-t-butylphenol), N,N'-hexamethylenebis-(3,5-di-t-butyl-4-hydroxy-hydroxycinnamamide), etc. The photostabilizer and/or the anti-oxidant is used preferably in combination with the ultraviolet absorber. The appropriate amount of photostabilizer used is 0.1 to 10 parts by weight, preferably 0.5 to 3 parts by weight based, on 100 parts by weight of modified polyolefin resin. The appropriate amount of anti-oxidant used is 0.1 to 5 parts by weight, preferably 0.2 to 3 parts by weight on the same basis.

Furthermore, a corrosion-preventive pigment may be blended in the barrier coat, which is effective for markedly improving the corrosion resistance of the coating film formed by the present invention.

The "corrosion-preventive pigment" to be incorporated into the barrier coat refers to the pigment which has the function of inhibiting or preventing corrosion of metals, and is clearly distinguished from coloring pigments for simply imparting color and extender pigments for adjusting the physical properties of the coating film. As examples of such corrosion-preventive pigment, lead-type pigments, chromate-type pigments, metallic powder pigments. In the present process, the type of usable corrosion-preventive pigment is not particularly limited, but suitable ones are those having such a composition that, upon contact with water, of which corrosion-preventive component is eluted. Particularly preferred corrosion-preventive pigments are those of which extracts with water show electroconductivity of at least 100 $\mu\mho/cm$, particularly at least 300 $\mu\mho/cm$.

The electroconductivity of aqueous extract of a corrosion-preventive pigment is measured as follows: 80 parts by weight of deionized water having electroconductivity of not higher than 1 $\mu\mho/cm$ and 20 parts by weight of the corrosion-preventive pigment are mixed and allowed to stand for 5 days at 30° C. (In the meantime, the mixture is mixed for 10 minutes per day. Then the supernatant liquid (aqueous extract) is separated and its electroconductivity is measured.

Examples of corrosion-preventive pigments having electroconductivity within the above-specified range include zinc chromate (1570 $\mu\mho/cm$), strontium chromate (973 $\mu\mho/cm$, barium chromate (736 $\mu\mho/cm$), calcium chromate (8000 $\mu\mho/cm$, basic lead chromate (111 $\mu\mho/cm$), basic lead sulfate (118 $\mu\mho/cm$), calcium phosphate (332 $\mu\mho/cm$), zinc molybdate (333 $\mu\mho/cm$), calcium molybdate (256 $\mu\mho/cm$), aluminum phosphomolybdate (182 $\mu\mho/cm$), barium metaborate (1540 $\mu\mho/cm$), ammonium metavanadate (7450 $\mu\mho/cm$) and the like. (The numerical values in the parentheses indicate the respective electroconductivity.) More than one of those can be used concurrently. Of those, particularly preferred are zinc chromate, strontium chromate, barium chromate and calcium chromate. The suitable amount of use of such corrosion-preventive pigment ranges 1–150 parts by weight, preferably 2–50 parts by weight, per 100 parts by weight of the modified polyolefin resin.

Such advance blending of corrosion-preventive pigment with the barrier coat can markedly improve the corrosion resistance of the coating system, as compared with the cases wherein the pigment is blended with the electrocoating paint.

The application of the barrier coat on the cation type electrocoating film already formed according to the method mentioned above can be conducted according to any known method such as spray coating, brush coating, dip coating, melt coating, electrostatic coating or the like. Normally preferred film thickness of the barrier coat ranges 1 to 20$\mu$, particularly 2 to 10$\mu$, in terms of thickness of dried film.

As mentioned previously, in the present process, on the surface of the barrier coat film formed is then coated an intermediate coating paint or a top coating paint. Prior to this coating, the barrier coat film can be baked. The prior baking is generally preferable but is not essential. Depending upon the type of paint to be applied on the barrier coat film, for example, when a top coating paint powder is directly applied on the barrier coat film, baking of the barrier coat film is not required and wet-on-wet appliction of an intermediate coating paint or a top coating paint is possible. There are cases where this wet-on-wet application is preferable.

The appropriate baking temperature is generally selected from the range of 60° to 140° C., particularly 80° to 140° C., within the range, furthermore, as will not cause deterioration or thermal deformation of plastic members.

Intermediate coating paint

Onto the surface of the barrier coat film can be applied an intermedfiate coating paint, prior to the application of a top coating paint. The main purpose of conducting this intermediate coating is to give the final coating film high quality finish excellent in durability, surface smoothness and sharpness, adhesion, etc. Therefore, when the final coating film is not required to have such a high quality, the intermediate coating can be omitted. However, in the preferred embodiments of the present invention, the application of an intermediate coating paint is generally preferable.

As the intermediate coating paint optionally usable in the present invention, there can be used any known intermediate coating paints which have been used in conventional coating systems consisting of a primer, an intermediate coating paint and a top coating paint and being excellent in adhesion, distructness image gloss, surface sharpness, overbaking resistance, weather resistance, etc. Specifically, there can be mentioned thermosetting intermediate coating paints using, as a vehicle main component, a combination of (1) a short or ultra-short oil alkyd resin having an oil length of 30% or less and/or an oil-free polyester resin and (2) an amino resin. The alkyd resin and the polyester resin desirably have a hydroxyl value ordinarily of 60 to 140, particularly 80 to 120 and an acid value of 5 to 100.

As the particularly preferable alkyd resins and polyester resins, there can be mentioned resins obtained from esterification between a polyhydric alcohol (e.g. ethylene glycol, propylene glycol, butylene glycol, hexanediol, neopentyl glycol, glycerine, trimethylolethane, trimethylolpropane, pentaerythritol) and a polybasic acid (e.g. phthalic acid, maleic acid, terephthalic acid, adipic acid, tetrahydrophthalic acid, fumaric acid, itaconic acid, trimellitic acid, pyromellitic acid, their anhydrides).

As the oil usable for modification of the alkyd resin, there can be mentioned, for example, drying oils or semi-drying oils such as linseed oil, soybean oil, safflower oil, tung oil, tall oil, dehydrated castor oil and the like, as well as unsaturated fatty acids obtained from said oils.

As the amino resin used in combination with the oil-modified alkyd resin or the oil-free polyester resin, generally there ar suitably used melamine resins etherified with an alkyl group of 1 to 5 carbon atoms, urea resins, benzoguanamine resins, etc. With respect to he quantitative ratio of the amino resin to other resins, it is desirable that the oil-modified alkyd resin and/or the oil-free polyester resin is 65 to 85%, preferably 70 to 80% in terms of solid weight and the amino resin is 35 to 15%, preferably 30 to 20%. At least part of the amino resin can be replaced by a polyisocyanate compound or a blocked polyisocyanate compound. As the blocked or non-blocked polyisocyanate compound, there can be mentioned, for example, tolylene diisocyanate, diphenylmethane diisocyanate, xylylene diisocyanate, hexamethylene diisocyanate, isophorone diisocyanate, a reaction product between 1 mole of trimethylolpropane and 3 moles of tolylene diisocyanate or hexamethylene diisocyanate.

The intermediate coating paint using the above resins as vehicle components preferably has a form of organic solvent type or aqueous type (aqueous solution or aqueous dispersion). The organic solvent type is most preferable. The intermediate coating paint may also have a form of non-aqueous dispersion type, high solid type, powder type or the like. It is preferable that the intermediate coating film has a pencil hardness generally of 3B to 6H, preferably B to 2H at 20° C. The intermediate coating paint can further contain, if necessary, extender pigments, color pigments and other additives ordinarily used for coatings, in amounts ordinarily used.

The application of the intermediate coating paint on the barrier coat film can be conducted, as in the application of the barrier coat, by spray coating, brush coating, dip coating, melt coating, electrostatic coating or the like. It is preferable that the intermediate coating film has a thickness generally of 10 to 100 $\mu$, preferably 15 to 30 $\mu$, when cured. The curing of the intermediate coating film can be conducted at any temperature suitable for the curing characteristics of the film as long as the temperature causes no deformation or deterioration of the plastic members and no substantial thermal deterioration of the film. However, when curing is effected by heating, the curing temperature is preferably 60° to 140° C., more preferably 80° to 140° C.

Top coating paint

This is a paint to be applied on the surface of the barrier coat film or of the intermediate coating film in order to give the coated bodies pleasant appearance. As this top coating paint, there can be used top coating paints used in conventional coating systems consisting of a primer, an intermediate coating and a top coating. As such a top coating paint, there can generally be used conventionally known paints capable of forming a coating film excellent in surface appearance (e.g. sharpness, smoothness, gloss), weather resistance (e.g. gloss retention, color retention, chalking resistance), chemical resistance, moisture resistance, curability, etc. As the top coating paint usable in the present invention, there can be mentioned, for example, paints preferably of organic solvent type or aqueous type, using as the main vehicle component a resin such as an amino-acrylic resin type, an acid-glycidyl-acrylic resin type, an isocyanateacrylic resin type, an amino-alkyd resin system, an amino-polyester resin type, an isocyanate-polyester resin type or the like.

Preferable examples of the top coating paints include those of amino-acrylic resin type, namely, thermosetting paints using amino resins as the crosslinking agent. Such paints use, as main components, (a) an acrylic resin obtianed by polymerizing an appropriate combination of a hard monomer (e.g. methyl methacrylate, ethyl methacrylate, n-butyl methacrylate, isobutyl methacrylate), a soft monomer (e.g. n-hexyl methacrylate, lauryl methacrylate, methyl acrylate, ethyl acrylate, n-butyl acrylate, 2-ethylhexyl acrylate), a functional group-containing monomer (e.g. acrylic acid, methacrylic acid, hydroxyethyl methacrylate, hydroxyethyl acrylate, acrylamide, glycidyl acrylate) and other monomer (e.g. styrene, acrylonitrile) and (b) an amino resin selected from resins such as a melamine resin etherified with an alkyl group of 1 to 5 carbon atoms and an urea resin etherified with an alkyl group 1 to 5 carbon atoms. Said acrylic resin (a) preferably has a number average molecular weight of 5,000 to 50,000, a hydroxyl value of 5 to 40 and an acid value of 2 to 100. Another preferable example of the top coating paint is an amino-alkyd resin type paint, wherein a butylated melamine resin is preferable as the amino resin component and an alkyd resin modified with a semi-drying oil or an ultra-short oil alkyd resin is preferable as the alkyd resin component.

When the top coating paint is particularly a paint capable of forming an ultra-hard film, the composite coating film formed in accordance with the present invention has a remarkably improved scuff resistance and is hard and flexible. This composite coating film, since its uppermost layer is an ultra-hard film and accordingly is hard, can almost completely prevent the formation of scuffs caused by a car washing brush, a polishing compound, dust, etc. and possesses improved weather resistance. Furhter, the composite coating film, since it also contains a barrier coat film having physical properties as mentioned previously beneath or below the uppermost layer, even if it receives a strong impact force by collision of rock salt, pebbles, etc. at the outermost ultra-hard film, can absorb completely or almost completely the impact energy within the barrier coat film; thereby, the impact energy does not reach the electrocoating film beneath the barrier coating film and yet the top coating film (and the intermediate coating film) receive little physical damage. That is, the barrier coat film functions as a buffer zone for impacts applied from outside, whereby the composite coating film has remarkably improved chipping resistance, the metallic substrate such as a steel panel can be protected from development of rust and corrosion caused by chipping, and the top coating film can be free from damage by collision of rock salt, pebbles, etc. Thus, the composite coating film is hard and flexible and accoredingly exhibits excellent performances as mentioned above.

"Ultra-hard film" said herein is a coating film having a hardness (as cured) of 4H to 9H at 20° C. when measured in accordance with a pencil hardness testing method.

The pencil hardness testing method used in the present invention is such that a glass plate is coated with a paint to be tested according to the present invention, the resulting composite coating film is cured, the resulting test plate is kept at 20° C., a pencil ("Uni" for drawing use, manufactured by Mitsubishi Pencil Ltd.) whose lead tip has been ground flatly so as to have a sharp edge is strongly pressed onto the coated surface of the test plate at an angle of 45° at such a pressure as the pencil lead is not broken, in this condition the pencil is moved by about 1 cm at a speed of 3 sec/cm, and in this way there is measured the hardness of the hardest pencil causing no scratch.

At the top coating paint capable of forming such an ultra-hard film, there can be mentioned, for example, crosslinking-curable paints using, as a vehicle component, a resin such as an amino-acrylic resin type, an amino-alkyd resin type, an amino-polyester resin type, an amino-fluorine resin type, an amino-silicone-polyester resin type, an unsaturated polyester resin type, an isocyanate-acrylic resin type, an isocyanate-polyester resin type, an isocyanate-fluorine resin type, an unsaturated acrylic resin type or the like. The preferable of these are top coating paints of amino-alkyd resin type, amino-acrylic resin type, amino-silicone-polyester resin type.

As the method for forming an ultra-hard film, there can be mentioned, for example, (1) when the vehicle component is polyester resin- or an alkyd resin-based, a method wherein the polybasic acid component of said resin is a hard, aromatic type polybasic acid such as phthalic acid, isophthalic acid, terephthalic acid, trimellitic acid, their anhydrides or the like, (2) when the vehicle component is acrylic resin-based, a method wherein as said resin a hard, acrylic type resin using the monomer component which gives a high glass transition temperature and (3) a method wherein the vehicle component is a resin having a relatively large molecular weight and containing within the molecule a large proportion of crosslinkable functional groups and the amount and type of catalyst (internal or external catalyst) and/or the amount and type of crosslinking agent (or curing agent) are suitably selected.

The form of the top coating paint used in the present invention has no particular restriction and can be of organic solvent type, non-aqueous dispersion type, aqueous solution type, aqueous dispersion type, powder type, high solid type, etc.

The top coating paint used in the present invention is classified into (1) an enamel paint obtained by adding, to a paint using the above mentioned main vehicle component, metallic pigments and/or coloring pigments and (2) a clear paint completely or substantially free from these pigments. Using such a paint, a top coating film can be formed thermally according to, for example, the following methods.

(1) A metallic paint containing metallic pigments and, if necessary, coloring pigments or a solid color paint containing coloring pigments is applied and heat-cured. (Metallic or solid color finishing by 1-coat 1-bake)

(2) A metallic paint or a solid color paint is applied and heat-cured. Then, a clear paint is applied and again heat-cured. (Metallic or solid color finishing by 2-coat.2-bake)

(3) A metalic paint or a solid color paint and then a clear paint are applied. Subsequently, the resulting two films are cured simultaneously. (Metallic or solid color finishing by 2-coat.1-bake)

The top coating paints mentioned above are applied preferably by spray coating, electrostatic coating, etc. The resulting coating film is dried and/or cured by room temperature drying, heat drying, heat curing, crosslinking curing by irradiation of active energy rays (e.g. electron rays, ultraviolet rays), etc., depending upon the form, type, etc. of paint applied.

The top coating film formed as above preferably has a thickness (as dried) of 25 to 40 $\mu$ when the method (1) is used and 10 to 30 $\mu$ (metallic and solid color paints) and 25 to 50 $\mu$ (clear paint) when the method (2) or (3) is used. The heating condition of the top coating film can vary depending upon the type of vehecle component used. However, preferably it is generally 60° to 140° C., particularly 80° to 120° C. and 10 to 40 min.

When a top coating paint of powder type is mainly used as the top coating paint, there can be used, for example, the following coating and baking methods.

(a) An enamel solid color paint of powder form obtained by adding color pigments to the vehicle component of the above mentioned powder paint is applied on the barrier coat film and baked. (Solid color finishing by 1-coat.1-bake (b) A solid color or metallic paint of liquid form is applied on the barrier coat film. Then, after or without baking, the above mentioned clear paint of powder form substantially or completely free from color pigments is applied and baking is conducted. (A solid color or metallic finishing by 2-coat.1-bake or by 2-coat 2-bake)

In the method (a), after the barrier coat film has been baked, preferably a barrier coat containing a compatible solvent is applied. Thereon, without baking, is applied a solid color enamel paint of powder form so that this application can give a film having a thickness (after baking) of about 30 to 150 $\mu$. The resulting film is baked at 80° to 140° C., particularly 120° to 140° C. By allowing the barrier coat film to contain a compatible solvent, the development of fine unevennesses (as seen on orange skins) on the surface of the top coating film can be prevented and the top coating film can have an appearance of excellent smoothness.

In the method (b), a barrier coat is applied and, after or without baking, a solid color or metallic paint of liquid form is applied thereon so that the latter application can give a film having a thickness (after baking) of 10 to 30 μ. Then, after baking at, for example, 60° to 140° C. or without baking, the above mentioned clear paint of powder form is applied so as to give a film having a thickness (after baking) of 30 to 150 μ and baking is conducted at 60° to 140° C., particularly 80° to 120° C.

The top coating film formed can have a pencil hardness generally of 2B to 9H at 20° C., depending upon factors such as the type of vehicle component contained in the film.

With the coating film formed as above according to the present invention by applying a barrier coat, optionally an intermediate coating paint, and a top coating paint onto the automotive outer body composed by assembling and integrating cation type electrocoated metallic member and plastic members, the coloring unevenness between the metallic part and plastic part is eliminated, and furthermore the film system exhibits markedly improved chipping resistance, corrosion resistance and other physical properties.

The present invention will be more specifically described hereinbelow, with referred to Examples and Comparative Examples.

I SAMPLES

(1) Materials to be coated (A) A steel panel treated with a surface treating agent of zinc phosphate type (dimensions: 300 mm×90 mm ×0.8 mm).

(B) A steel panel having an acute-angled portion obtained by bending the steel panel (A) by 90°.

(C) A polyamide resin panel degreased with trichloroethane vapor (dimensions: 300 mm×90 mm×0.8 mm).

(2) Cation type electrocoating paints (A) A paint using, as vehicle components, a polyamide-modified bisphenol type epoxy resin (acetic acid used as a neutralizing agent) and a blocked polyisocyanate compound (pH: 6.5, solid content: 20% by weight, water absorption of coating film: 3.5% by weight).

(B) A paint comprising 100 parts by weight of the vehicle components of the paint (A) and 70 parts by weight of pigments composed of titanium dioxide, carbon black and clay at a weight ratio of 30:1.5:30 (pH: 6.5, solid content: 20% by weight, water absorption of coating film: 4.8% by weight).

(3) Barrier coats (A) An organic solvent solution of a mixture of a resin obtained by graft-polymerizing maleic acid onto a propylene-ethylene copolymer (100 parts by weight) with Printex L-6 (an electroconductive carbon manufactured by Degussa Co. −25 parts by weight). (static glass transition temperature: −43° C., elongation at break at −20° C.: 410%, volume specific resistivity: $2.3\times10^3\Omega cm$).

(B) A toluene solution of a mixture of above resin (A) (100 parts by weight), rosin (10 parts by weight) and Printex L-6 (10 parts by weight): (static glass transition temperature: −52° C., elongation at break at −20° C.: 700%, volume specific resistivity: $4.5\times10^4\Omega cm$)

(C) An organic solvent solution of a mixture formed by dispersing Printex L-6 (25 parts by weight) and zinc chromate (10 parts by weight) in the above resin (A) (100 parts by weight) (static glass transition temperature: −43° C., elongaiton at break at −20° C.: 400%, volume specific resistivity: $2.3\times10^3\Omega cm$).

(D) An organic solvent solution of a mixture of the above resin (A) (100 parts by weight), rosin (10 parts by weight), strontium chromate (20 parts by weight) and Printex L-6 (10 parts by weight) (static glass transition temperature: −52° C., elongation at break at −20° C.: 680%, volume specific resistivity: $4.5\times10^4$ $\Omega cm$).

(E) A toluene solution containing the resin (A), 2-[2-hydroxy-3,5-di(1,1-dimethylbenzene)phenyl]-2H-benztriazole (ultraviolet absorber), bis(1,2,2,6,6-pentamethyl-4-piperidinyl) sebacate (photostabilizer) and Printex L-6 at a weight ratio of 100 parts, 1 part, 0.5 part and 10 parts.

(F) A toluene solution of a mixture composed of 25 parts by weight of Printex L-6 dispersed in 100 parts by weight of the resin (A) (static glass transition temperature: +5° C., volume specific resistivity: $5.2\times10^{-3}$ $\Omega cm$).

(4) Intermediate coating paint

Amilac N-2 Sealer (an intermediate coating paint of amino polyester resin type manufactured by KANSAI PAINT CO., LTD., pencil hardness: H).

(5) Top coating paints (A) Amilac White (a top coating paint of aminoalkyd resin type manufactured by KANSAI PAINT CO., LTD., a white paint for 1-coat.1-bake—pencil hardness at 20° C.: H).

(B) Magicron Silver (a top coating paint of aminoacrylic resin type manufactured by KANSAI PAINT CO., LTD., a silver metallic paint for 2-coat.1-bake—pencil hardness at 20° C.: H).

(C) Magicron Clear (a top coating paint of aminoacrylic resin type manufactured by KANSAI PAINT CO., LTD., a clear paint for 2-coat.1-bake—pencil hardness at 20° C. H).

(D) Radicure P Black (an electron rays-curing type paint using an acrylate-polyester resin, manufactured by KANSAI PAINT CO., LTD., pencil hardness: 6H). The coating film of this paint was cured by applying 6 Mrad of electron rays at 270 KeV.

II EXAMPLES AND COMPARATIVE EXAMPLES

Using the above samples, the cation type electrocoating paints were applied to the substrates (A) and (B) and the coating films were cured by heating. Then the coated steel panel and the resin panel (C) were assembled and integrated, and of which surfaces were applied with the barrier coat, an intermediate coating and top coating. The particulars of the coating steps were as shown in Table 1 below.

TABLE 1

| | | Example | | | | | | | | | | | | | | | | | | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Cation electro-coating | Body to be coated paint | 1C1B | 2C1B | (A)·(C)(A) | 2C1B | 1C1B | 1C1B | 1C1B | (B)·(C)(B) | (B)·(C)(B) | (A)·(C)(A) | (A)·(C)(A) | (A)·(C)(A) | (A)·(C)(A) | (B)·(C)(B) | (B)·(C)(B) | (A)·(C)(A) | 1C1B | (A)·(C)(A) | 1C1B | 1C1B | (B)·(C)(B) | 1C1B |
| | film thickness(μ) flat portion | (A)35 | (B)15 | 20 | (A)35 | (B)15 | (A)35 | (B)15 | 20 | 20 | 20 | 20 | 20 | 20 | 20 | 20 | (A)35 | (A)35 | 20 | (D)35 | (A)35 | 20 | (B)15 |
| | acute-angled portion | | | — | | | | 10 | 10 | 10 | 10 | — | — | — | 10 | 10 | | | — | | | 10 | |
| Barrier coating | paint | | (A) | | (B) | (B) | (A) | (A) | (D)35 | (A) | (B) | (C) | (D) | (C)(D) | (B) | (C)(D)(A) | | | | (E) | | | (C) |
| Intermediate coating | | (A) baking conditions 140° C. · 30 min, film thickness 20μ | | | | | | | | | | | | | | | | | | | | | | |
| Top coating | coating system | 1C1B | 2C1B | 1C1B | 2C1B | 1C1B | 2C1B | 1C1B | 2C1B | 1C1B | 2C1B | 2C1B | 2C1B | 2C1B | 2C1B | 1C1B | 1C1B | 1C1B | 2C1B | 1C1B | 1C1B | | 2C1B |
| | paint film thickness (μ) | (A)35 | (B)15 | (D)35 | (A)35 | (B)15 | (A)35 | (B)15 | (D)35 | (A)35 | | (B)15 | (B)15 | (B)15 | (B)15 | (A)35 | (A)35 | (A)35 | (B)15 | (D)35 | (A)35 | | (B)15 |
| | paint film thickness (μ) | | (C)35 | | | (C)35 | (C)35 | | | | (D)35 | (C)35 | (C)35 | (C)35 | (C)35 | | | | (C)35 | | | | (C)35 |
| | film-curing condition | 140° C.·30 min. | | | | | | | 140° C.·30 min. | | | | | | 140° C.·30 min. | | | | | | | | |

| | | Comparative Example | | | | | | | | | | | | | | | | | | | |
|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| Cation electro-coating | Body to be coated paint film thickness(μ) flat portion | 1C1B (A)35 | (A)·(C)(A) 20 | | | | | (B)·(C)(B) 20 | (A)35 | (A)·(C)(B) 20 | (A)·(C)(B) 20 | (A) | (B)·(C)(A) 10 | | (B) 10 | (A)·(C)(A) 20 | (A)·(C)(A) | | | (B)·(C)(B) 20 |
| | acute-angled portion | | — | | | | | 10 | | — | — | 1 | 1 | 10 | 1 | — | — | | | 10 |
| Barrier coating | paint | | | | (F) | | | (D) | (F) | (F) | (F) | (A) | | | (F) | | (F) | | (F) | |
| Intermediate coating | | (A) baking conditions 140° C. · 30 min. film thickness 20μ | | | | | | | | | | (A) baking conditions 140° C. · 30 min. film thickness 20μ | | | | | | | | |
| Top coating | coating system | 1C1B | 2C1B | | 1C1B | | 2C1B | | 1C1B | | | | 2C1B | | | | | 1C1B | | |
| | paint film thickness (μ) | (A)35 | (B)15 | | | | (B)15 | | (A)35 | | | | (B)15 | | | | | (A)35 | | |
| | paint film thickness (μ) | | (C)35 | | | | (C)35 | | | | | | 35 | | | | | (C) | | |
| | film-curing condition | 140° C.·30 min | | | | | | | | | | | 140° C.·30 min. | | | | | | | |

In Table 1, the conditions of cation electrocoating were as follows: bath temperature: 28° C., pH: 6.5, load voltage: about 250 V, electrification: about 180 sec. After electrocoating, water washing was conducted and then baking was conducted at 170° C. for 30 min. All film thicknesses are those after curing.

The barrier coats were applied using an air spray machine. All film thicknesses were 6 to 10 μ after drying at flat portions.

The intermediate coating paints and the top coating paints were spray-coated using an electrocoating equipment.

In the top coating, "1C1B" refers to a coating system wherein a color paint is applied and then baked at 140° C. for 30 min. "2C1B" refers to a coating system wherein a metallic paint and a clear paint are applied in this order on a wet-on-wet basis and then the resulting two films are simultaneously baked at 140° C. for 30 min. and cured. All film thickness are those at flat portions.

The coating film of top coating paint (D) was cured by electron beams irradiation at 270 KeV at a dosage of 6 Megarad.

III RESULTS OF PERFORMANCE TESTS

The coated panels obtained in the above Examples and Comparative Examples were used as test panels and subjected to performance tests. The results are shown in Table 2 which appears later.

[Test items and test methods]

1. Chipping resistanc*1

(1) Gravel testing machine: Q-G-R Gravelometer manufactured by Q Panel Co.
(2) Stones to be blown: Crushed stones having diameters of about 15 to 20 mm.
(3) Volume of stones to be blown: About 500 ml.
(4) Blowing air pressure: ABout 4 kg/cm$^2$.
(5) Test temperature: About 20° C.

A test panel was fixed to a support panel. About 500 ml of crushed stones were allowed to hit the test panel using a blowing air pressure of about 4 kg/cm$^2$. Thereafter the test panel was tested for film surface condition and salt water spray resistance. Film surface condition was examined visually and evaluated based on the criteria given below. In the test of salt water spray resistance, a test panel after having been hit by the crushed stones was subjected to a salt water spray test by JIS Z 2371 for 480 hr; then, an adhesive cellophane tape was stuck on the film surface of the test panel and rapidly peeled off; and the state of subsequent rust development, condition of corrosion, peeling of coating film, etc. at the hit portions were observed.

Evaluation criteria (1) Film surface condition

⊖ : Cracking by hitting is recognizable very slightly at the limited places of a top coating film. There is no peeling of an electrocoating film.
○: Cracking by hitting is recognizable in places of a top coating film and peeling of the electrocoating film is seen at less numbers of places.
Δ: Top coating peeled off at many places and peeling of electrocoated film occured at a minor degree.
X : The greatest part of the top coating film peels off. An electrocoating film peels off at the hit portions and their surrounding areas.

(2) Salt water spray resistance

⊖ : Rust development, corrosion, film peeling, etc. are not observed.
○ : Rust, corrosion and film peeling are slight.
Δ: Rust, corrosion and film peeling are a little severe.
X : Rust, corrosion and film peeling are very severe.

Chipping resistance after acceleration exposure was tested in accordance with the above method after the coated panel has been exposed for 2,000 hr in a sunshine weatherometer (WEL-SUN-HC Model manufactured by Suga Shikenki K.K.).

2. Impact resistance

This test was conducted in an atmosphere of 0° C. in accordance with JIS K 5400-1979 6.133B. A weight of 500 g was dropped from a height of 50 cm to examine the damage incurred on the coating film.

⊖ : No change.
Δ: Slight appearance of cracks and peeling.
X : Severe cracks and peeling.

3. Adhesion

The coating film of a test panel was formed into 100 squares each of 1 mm×1 mm in accordance with JIS K 5400-1979 6.15. Thereon was stuck an adhesive cellophane tape. The tape was subjected to rapid peeling and the number of remaining squares was counted.

Adhesion after acceleration exposure was tested in accordance with the above method after a test panel has been exposed for 2,000 hr in a sunshine weatherometer (WEL-SUN-HC manufactured by the Suga Shikenki K.K.).

4. Water resistance

A test panel was immersed in water of 40° C. for 10 days and the film surface was evaluated.

⊖ : No change.

5. Smoothness

A test panel was visually examined for the formation of unevennesses on the film surface.

⊖ : Almost none.
Δ: A small number of unevennesses.
X : A large number of unevennesses.

6. Corrosion resistance at acute-angled portion

A test panel was subjected to the same salt water spray test as in 1. Chipping resistance for 480 hr. The condition of film surface at the acute-angled portion was examined visually.

⊖ : No rust development.
Δ: Slight rusting.
X : Severe rusting.

7. Filiform corrosion resistance

In the coating film of a test panel two lines were cut diagonally with a cutter down to the substrate of the panel. Then the test panel was placed in a salt water spray tester of JIS Z 2371 for 48 hr after which the film surface was washed with deionized water. Then, the test panel was placed in a constant temperature and constant humidity box (temperature: 40°±2° C., R.H.: 85±2%) for 480 hr and the extent of filiform corrosion on the test panel was examined. An average length and density of filiform corrosion were recorded.

Evaluation criteria

F: 2 to 3 or less filiform corrosions within each 10 mm portion of cut lines

M: around 5 to 6 filiform corrosions within each 10 mm portion of cut lines

D: 10 or more filiform corrosions within each 10 mm portion of cut lines

8. Scab corrosion resistance

A test panel was immersed in warm water of 40° C. for 120 hr and then dried for 4 hr at 20° C. The resulting test panel was subjected to chipping using 300 g of No. 6 crushed stones at 4 kg/cm² and also to straight line cutting. Then, the panel was subected to repetition of a unit test [immersion in 5% aqueous NaCl solution at 30° C. for 2 hr→standing at −20° C. for 1 hr→standing outdoors for 45 hr]. This unit test was conducted 3 times per week as one cycle. After 10 cycles, there was examined the film surface condition (particularly, rust, swelling, etc.)

⊖ : No distinct change.

Δ: Slight rust and swelling.

X : Severe rust and swelling.

9. Pencil hardness

The hardness of the hardest pencil which gives no scratch at 20° C.

10. Scuff resistance

On a test panel held horizontally were laid 4 sheets of victoria lawns at 20° C. Thereon was placed a weight of 1 kg (for use in even balances and having a flat bottom of 5 cm in diameter). By holding the ends of the victoria lawns and pulling them, the victoria lawns and the weight were moved on the panel reciprocately 20 times at a speed of 20 cm/sec. Then, the film surface condition was evaluated.

⊖ : Substantially free from scuff.

Δ: Slight scuff.

X : Severe scuff.

TABLE 2

| | | Example | | | | | | | | | | | | | | | | | | | | | |
|---|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| Chipping resistance | | | | | | | | | | | | | | | | | | | | | | | |
| before exposure | surface condition | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | salt water spray resistance | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| after exposure | surface condition | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | salt water spray resistance | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| Impact resistance | | ○ | ○ | ○ | ○ | ○ | ○ | ○ | ○ | ○ | ○ | ○ | ○ | ○ | ○ | ○ | ○ | ○ | ○ | ○ | ○ | ○ | ○ |
| Adhesion before exposure | | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| | | 100 | 100 | 100 | 100 | 100 | 100 | 100 | 100 | 100 | 100 | 100 | 100 | 100 | 100 | 100 | 100 | 100 | 100 | 100 | 100 | 100 | 100 |
| Adhesion after exposure | | 100 | 100 | 100 | 100 | 100 | 100 | 100 | 100 | 100 | 100 | 100 | 100 | 100 | 100 | 100 | 100 | 100 | 100 | 100 | 100 | 100 | 100 |
| Water resistance | | — | — | — | — | — | — | — | — | — | — | — | — | — | — | — | — | — | — | — | — | — | — |
| Smoothness | | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| Corrosion resistance at acute-angled portion | | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| Linear rust resistance | | — | — | — | — | — | — | — | — | — | — | — | — | — | — | — | — | — | — | — | — | — | — |
| Scab corrosion resistance | | — | — | — | — | — | — | — | — | — | — | F | F | F | F | F | — | — | — | — | — | — | — |
| Pencil hardness | | H | H | 5H | H | H | H | H | 5H | H | 5H | H | H | H | H | H | H | H | H | 5H | H | H | H |
| Scuff resistance | | △ | △ | ◎ | △ | △ | △ | △ | ◎ | △ | ◎ | △ | △ | △ | △ | △ | △ | △ | △ | ◎ | △ | △ | △ |

| | | Comparative Example | | | | | | | | | | | | | | | | | | | |
|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 |
| Chipping resistance | | | | | | | | | | | | | | | | | | | | |
| before exposure | surface condition | × | × | × | △ | × | × | × | △ | × | △ | × | × | △ | △ | × | × | △ | × | △ |
| | salt water spray resistance | × | × | × | △ | × | × | × | △ | × | △ | × | × | △ | △ | × | × | △ | × | △ |
| after exposure | surface condition | × | × | × | △ | × | × | × | △ | × | △ | × | × | △ | △ | × | × | △ | × | △ |
| | salt water spray resistance | × | × | × | × | × | × | × | × | × | × | × | × | × | × | × | × | × | × | × |
| Impact resistance | | × | × | × | △ | × | × | × | △ | × | △ | × | × | △ | △ | × | × | △ | × | △ |
| Adhesion before exposure | | 100 | 100 | 100 | 100 | 100 | 100 | 100 | 100 | 100 | 100 | 100 | 100 | 100 | 100 | 100 | 100 | 100 | 100 | 100 |
| Adhesion after exposure | | 70 | 70 | 70 | 90 | 70 | 70 | 70 | 90 | 70 | 90 | 70 | 70 | 90 | 90 | 70 | 70 | 90 | 70 | 90 |
| Water resistance | | — | — | — | — | — | — | — | — | — | — | — | — | — | — | — | — | — | — | — |
| Smoothness | | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ | ◎ |
| Corrosion resistance at acute-angled portion | | — | — | — | ◎ | △ | △ | △ | △ | — | — | × | △ | × | × | △ | — | △ | × | × |
| Linear rust resistance | | D | D | D | M | D | D | D | M | D | M | D | D | M | M | D | D | M | D | M |
| Scab corrosion resistance | | × | × | × | △ | × | × | × | △ | × | △ | × | × | △ | △ | × | × | △ | × | △ |
| Pencil hardness | | H | H | 5H | H | H | H | 5H | H | H | H | H | H | H | H | H | H | H | H | H |
| Scuff resistance | | △ | △ | ◎ | △ | △ | △ | ◎ | △ | △ | △ | △ | △ | △ | △ | △ | △ | △ | △ | △ |

What we claim is:

1. A process of coating automotive bodies which are composed of metallic members and plastic members, said process comprising assembling metallic members and plastic members into automotive outer bodies, applying a cationic electrodeposition paint to the metallic members either before or after the assembling, applying onto the surfaces of the two types of members, including the electrodeposited surfaces of the assembled body, a barrier coat comprising a modified polyolefin resin and capable of forming a barrier coat film having a static glass transition temperature of 0° to −160° C. and then applying thereon a top coating paint, said modified polyolefin resin being selected from the group consisting of: (i) resins obtained by graft-polymerizing maleic acid or maleic anhydride onto base polyolefin resins, (ii) resins obtained by graft-polymerizing acrylic acid or methacrylic acid onto chlorinated products of base polyolefin resins (iii) copolymers between (a) at least one member selected from ethylenic hydrocarbons and (b) at least one comonomer selected from vinyl acetate, acrylic acid and methacrylic acid, (iv) compositions obtained by adding 1 to 90 parts by weight of chlorinated polyolefins to 100 parts by weight of base polyolefins, (v) compositions obtained by adding 1 to 90 parts by weight of acrylic resins having a static glass transition temperature of 0° C. or lower and a number average molecular weight of 5,000 to 100,000 to 100 parts by weight of base polyolefin resins, and (vi) compositions obtained by adding 1 to 90 parts by weight of a styrene-butadiene copolymer to 100 parts by weight of base polyolefin resins.

2. A process according to claim 1, wherein the cationic electrodeposition paint is a thermosetting cathodic deposition paint obtained by neutralizing a base resin having basic amino groups with an acid and dissolving or dispersing the resulting resin in water.

3. A process according to claim 1, wherein the cationic electrodeposition paint contains 35 parts by weight or less of pigments based on 100 parts by weight of resin solid.

4. A process according to claim 1, wherein the cationic electrodeposition paint contains 40 to 150 parts by weight, of pigments based on 100 parts by weight of resin solid.

5. A process according to claim 1, wherein the plastic members are subjected to a preliminary surface treatment selected from degreasing with solvent vapor, grinding, acid treatment and corona discharge treatment.

6. A process according to claim 1, wherein the film formed by the barrier coat has a static glass transition temperature of −30° to −60° C.

7. A process accoding to claim 6, wherein the static glass transition temperature is −40° to −55° C.

8. A process according to claim 1, wherein the modified polyolefin resin is obtained by graft-polymerizing maleic acid or maleic anhydride onto a polyolefin resin.

9. A process according to claim 8, wherein the modified polyolefin resin is obtained by graft-polymerizing 0.1 to 50 parts by weight of maleic acid or maleic anhydride onto 100 parts by weight of a propylene-ethylene copolymer having a propylene:ethylene mole ratio of 40:60 to 80:20.

10. A process according to claim 1, wherein the modified polyolefin resin is a blend of 100 parts by weight of a polyolefin resin and 1 to 90 parts by weight of a chlorinated polyolefin having a chlorination degree of 1 to 60% and a number average molecular weight of 10,000 to 1,000,000.

11. A process according to claim 10, wherein the polyolefin resin is a propylene-ethylene copolymer having a propylene:ethylene mole ratio of 40:60 to 80:20 and the chlorinated polyolefin is a chlorinated polypropylene.

12. A process according to claim 1, wherein the film formed by the barrier coat has an elongation at break of 200 to 1,000% in an atmosphere of −20° C.

13. A process according to claim 12, wherein the elongation at break is 300 to 800% in an atmosphere of −20° C.

14. A process according to claim 1, wherein the barrier coat contains an electroconductive substance.

15. A process according to claim 1, wherein the barrier coat contains at the most 150 parts by weight of an electroconductive substance per 100 parts by weight of the modified polyolefin resin.

16. A process according to claim 1, wherein the barrier coat contains a corrosion-preventive pigment.

17. A process according to claim 16, wherein the corrosion-preventive pigment is that of which aqueous extract has an electroconductivity of at least 100 $\mu\mho$/cm.

18. A process according to claim 16, wherein the barrier coat contains, per 100 parts by weight of the modified polyolefin resin, 1-150 parts by weight of the corrosion-preventive pigment.

19. A process according to claim 16, wherein the water absorption of the film formed of the cationic electrodeposition paint is within the range of 0.3-20% by weight.

20. A process according to claim 1, wherein the barrier coat is an organic solvent-base paint.

21. A process according to claim 1, wherein the film formed by the barrier coat has a thickness of 1 to 20 $\mu$.

22. A process according to claim 1, wherein an intermediate coating paint is applied onto the barrier coat before applying top coat.

23. A process according to claim 22, wherein the intermediate coating pain is a thermosetting intermediate coating pain of an organic solvent-base paint or a water-base paint containing, as a vehicle main component, a combination of (1) a short oil ultra-short oil alkyd resin having an oil length of 30% or less and/or an oil-free polyester resin and (2) an amino resin.

24. A process according to claim 21, wherein the film formed by the intermediate coating paint has a pencil hardness of 3B to 6H at 20° C.

25. A process according to claim 21, wherein the film formed by the intermediate coating film has a thickness of 10 to 100 $\mu$ as cured film.

26. A process according to claim 1, wherein the top coating paint is a top coating paint of an alkyl-etherified amino resin/acrylic resin or an alkyd resin.

27. A process according to claim 1, wherein the top coating paint is a paint capable of forming an ultra-hard coating film.

28. A process according to claim 27, wherein the ultra-hard coating film has a pencil hardness of 4H to 9H at 20° C. as cured film.

29. A process according to claim 4 in which the cationic electrodeposition paint contains 55 to 100 parts by weight of pigments based on 100 parts by weight of resin solid.

30. A process according to claim 1, wherein the top coating paint is in a powder form.

31. A process according to claim 30, wherein the barrier coat contains a compatible solvent.

32. A process according to claim 30, wherein the barrier coat contains at least one deterioration inhibitor for resins, selected from ultraviolet absorbers, photostabilizers and anti-oxidants.

33. The automotive outer bodies coated according to the process of claim 1.

* * * * *